US005097549A

United States Patent [19]

Swing

[11] Patent Number: 5,097,549

[45] Date of Patent: Mar. 24, 1992

[54] BEACH TOWEL WITH SYMMETRICAL TANNING DEVICE

[76] Inventor: Alan H. Swing, 916 Yachtsman Way, Annapolis, Md. 21403

[21] Appl. No.: 594,745

[22] Filed: Oct. 9, 1990

[51] Int. Cl.[5] .......................... F47G 9/06; G01C 17/34

[52] U.S. Cl. .......................................... 5/417; 33/270

[58] Field of Search .................................... 5/417–420; 128/372, 376; 33/270, 275 R

[56] References Cited

U.S. PATENT DOCUMENTS

| | | | |
|---|---|---|---|
| 2,536,328 | 1/1951 | Triplett | 33/61 |
| 2,840,092 | 6/1958 | Hill | 5/417 X |
| 2,907,057 | 10/1959 | Specht | 5/417 |
| 3,266,151 | 8/1966 | Berent | 33/270 |
| 3,646,896 | 3/1972 | Derujinsky et al. | 5/419 X |
| 3,935,653 | 2/1976 | Klein | 5/417 X |
| 4,546,507 | 10/1985 | Weinstein | 5/419 |
| 4,856,512 | 8/1989 | Damus et al. | 33/270 X |
| 4,914,767 | 4/1990 | Balicki | 5/419 |

*Primary Examiner*—Michael F. Trettel

[57] ABSTRACT

A beach towel or blanket with a metal eyelet on its bottom edge through which a decorative pivot dowel is passed and into the sand at the beach.

Said towel is held, by one person, at the corners of the opposite end and rotated about the pivot dowel until the shadow of the pivot dowel is aligned with the shadow line (or center) of the symmetry gauge printed on the beach towel. This positions the beach towel and subsequent sun bather at the most advantageous position to receive the sun's rays for symmetrical tanning for that period of the day.

As the day progresses the beach towel will have to be rotated to keep the shadow of the pivot dowel within the symmetry tanning gauge. During this simple, timeless, re-alignment, the sun bather would doubtlessly evaluate their exposure time in the sun which is a health and safety feature in itself.

1 Claim, 2 Drawing Sheets

BEACH TOWEL WITH SYMMETRICAL TANNING DEVICE

This invention relates to a beach towel and more specifically a towel in conjunction with other components to indicate the correct positioning of the beach towel and subsequent sun bather for symmetrical tanning.

BACKGROUND AND PRIOR ART

Sun bathing at the beach is usually enjoyed in a folding lounge chair or most often on a blanket or an over sized towel manufactured as a "beach towel."

At present the sun bather makes a guess at the most advantageous position to place their towel to receive direct sun rays for symmetrical tanning. As the sun moves the bather must guess again as they re-position their towel.

Other inventions have sought to eliminate periodic repositioning of the beach blanket or towel.

U.S. Pat No. 4,914,767 shows a large beach blanket with detachable pillows and tie down clamps. Numbers are printed around the perimeter of the blanket as in that on the face of a clock. This allows the sun bather to pick a random starting position on the blanket and roll their self to the next position as the day progresses without ever having to get up from the beach blanket.

U.S. Pat No. 4,231,125 shows a beach towel that can be joined along the edge to other beach towels to make a larger beach towel.

U.S. Pat No. 2,536,328 shows a cap for a bottle of tanning lotion that indicate time intervals making it possible for a person to leave their watch at home.

U.S. Pat No. 3,266,151 shows a portable sun dial device suitable for the beach, again for the advantage of leaving your watch at home.

Prior art is suggestive of prolonged, comfortable, stays in a hot sun without any indication as to which position to lay at any given time.

It is the intention of the invention to place the towel and subsequent sun bather in the proper position for tanning their body in an even, symmetrical manner.

It is also the intention of the invention to reduce the occurrence of severe sunburn and sun poisoning by giving the sun bather a constant reminder to "GET UP" to rotate the towel, whereby encouraging the evaluation of his or her exposure time in the sun, as included in the printed users instructions.

Becoming too comfortable in the sun results in over exposure and sunburn.

SUMMARY OF THE INVENTION

According to the invention there is provided a beach towel made of any suitable material such as cotton, synthetic material or any combination thereof, using a manufacturing process currently in existence.

A metal or plastic eyelet is crimped in the center and approximately two inches in from the edge of the bottom of the towel, as determined by the art work printed on the towel.

According to a further feature, the beach towel has a symmetry tanning gauge printed on the beach towel and radiating from the eyelet at the bottom of the towel.

According to another feature, the invention includes a pivot dowel for passing through the eyelet in the beach towel and into the sand.

According to still another feature, the pivot dowel has a novelty ornamented top piece that serves as a safety device.

According to still another feature, the ornamented pivot dowel will serve as a locator for finding ones beach blanket.

According to still another feature the ornamented top of the pivot dowel matches the printed design on the towel and is not limited to the design shown in FIGS. 1–3.

DETAILED DESCRIPTION

Before explaining the disclosed details of the present invention, it is to be known that the terminology used herein is for the purpose of description and not of limitation.

Figure 1:
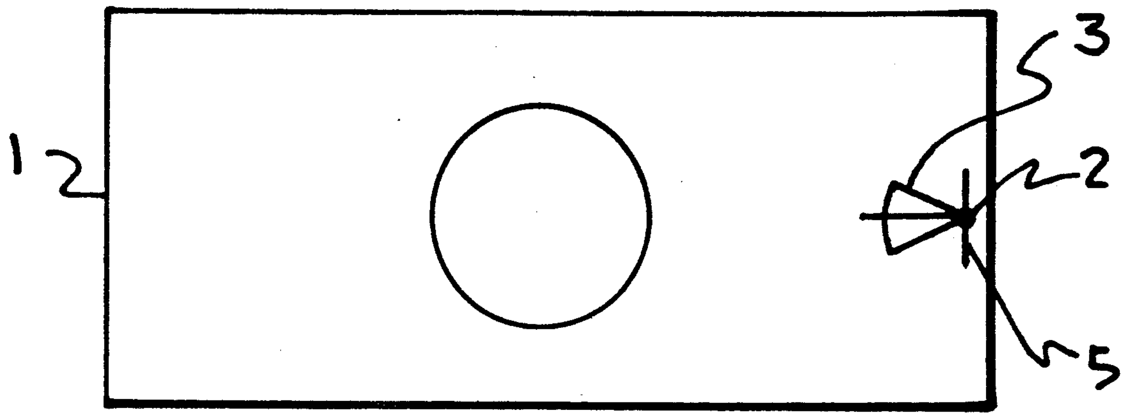
FIG. 1 is a plan view of the invention showing the printed symmetry tanning gauge and pivot dowel in place.

FIG. 1 is a beach towel 1, approximate size of three feet by five feet, having an eyelet 2, three quarters of an inch, inside diameter, at the bottom and in the middle of the three foot side and approximately two inches from the edge.

The symmetry tanning gauge 3, that is printed on the towel, radiates from the eyelet. Its angle is fifteen degrees to either side of the center or "shadow line", accommodating the invention's use in both the northern and southern hemispheres. The symmetry tanning gauge has a radius of ten inches.

Figure 2:
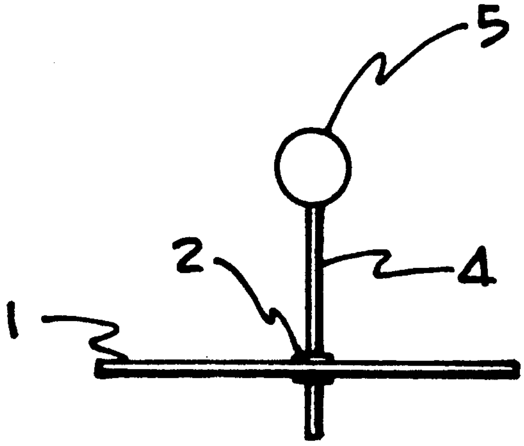
FIG. 2 is a front view of the invention showing the assembly of the pivot dowel with the safety, ornamented top.

FIG. 2 is the pivot dowel 4, 0.625 inches in diameter and approximately thirty inches long with novelty ornamented safety top 5, attached.

Figure 3:
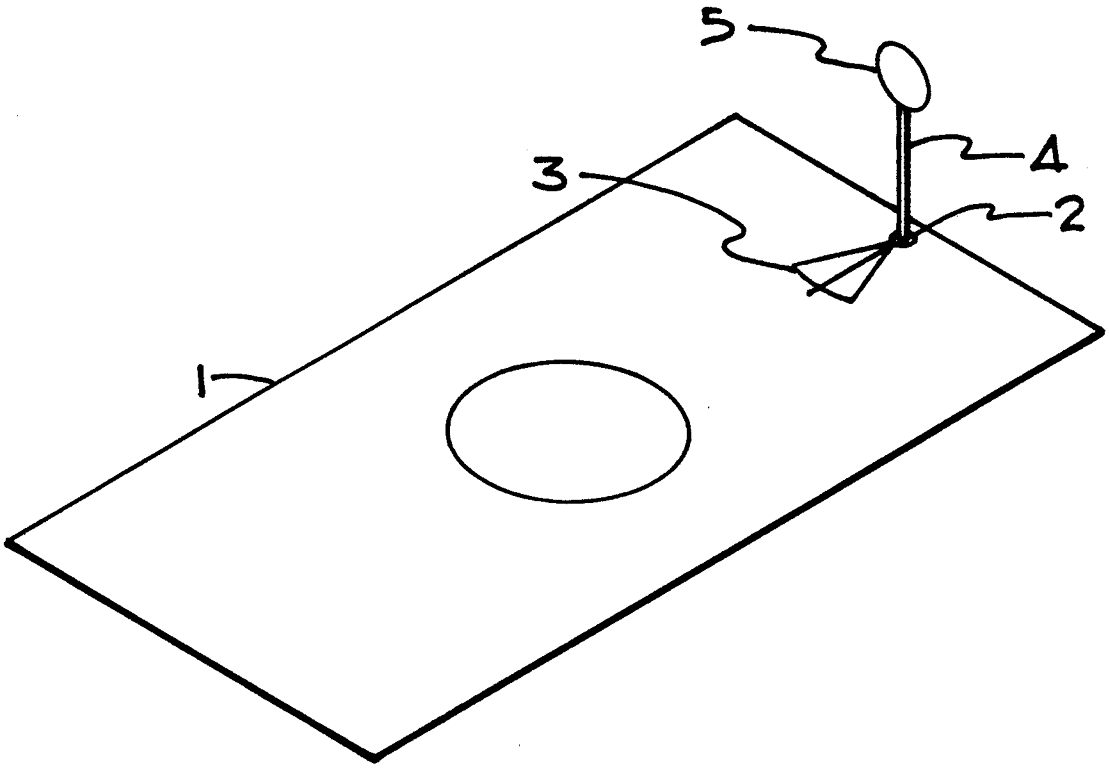
FIG. 3 is a perspective view of the invention showing the beach towel with the pivot dowel as used.

FIG. 3 is the beach towel and pivot dowel when in use.

What I claim as new and desire to secure by Letters Patent is:

1. A beach blanket assembly comprising the combination of a generally rectangularly shaped beach towel with a single grommet installed adjacent the center of one of the short edges of the towel's perimeter, an arcuate gauge printed on the towel radiating from the grommet with an arc of 30 degrees, of which 15 degrees is to either side of a line extending through the grommet parallel to the towel's longitudinal axis, a pivot/gnomon dowel extending through said grommet into a ground surface underlying the towel, said pivot/gnomon dowel having a decorative end piece which matches a printed design upon said towel, said pivot/gnomon dowel and said arcuate gauge acting in combination as a means for measuring a period of time when the towel is spread upon said surface.

* * * * *